United States Patent
Meyer et al.

(10) Patent No.: US 10,633,234 B2
(45) Date of Patent: Apr. 28, 2020

(54) MODULAR OBSERVATION ASSEMBLY AND METHOD

(71) Applicants: Aaron Christopher Meyer, Midlothian, TX (US); Roger Bernard Meyer, Arlington, TX (US)

(72) Inventors: Aaron Christopher Meyer, Midlothian, TX (US); Roger Bernard Meyer, Arlington, TX (US)

(*) Notice: Subject to any disclaimer, the term of this patent is extended or adjusted under 35 U.S.C. 154(b) by 50 days.

(21) Appl. No.: 15/818,376

(22) Filed: Nov. 20, 2017

(65) Prior Publication Data
US 2018/0141797 A1    May 24, 2018

Related U.S. Application Data

(60) Provisional application No. 62/423,946, filed on Nov. 18, 2016.

(51) Int. Cl.
*B66F 11/04* (2006.01)
*A01M 31/02* (2006.01)
*E04G 1/22* (2006.01)

(52) U.S. Cl.
CPC ............. *B66F 11/04* (2013.01); *A01M 31/02* (2013.01); *B66F 11/042* (2013.01); *E04G 1/22* (2013.01)

(58) Field of Classification Search
CPC ......... B66F 11/00; B66F 11/04; B66F 11/042; E04G 1/22; A01M 31/02
See application file for complete search history.

(56) References Cited

U.S. PATENT DOCUMENTS

| | | | | |
|---|---|---|---|---|
| 1,901,726 A * | 3/1933 | Clement | ................... | E04G 1/22 182/101 |
| 2,035,294 A * | 3/1936 | Black | ...................... | B66F 11/04 182/132 |
| 2,573,575 A * | 10/1951 | Keroson | ................. | B66F 11/04 182/14 |
| 2,798,623 A * | 7/1957 | Lawrence | ............. | A01D 46/20 182/2.2 |
| 3,016,105 A * | 1/1962 | House | ....................... | E04G 1/22 182/115 |
| 3,596,735 A * | 8/1971 | Denier | .................. | B66F 11/042 182/16 |
| 3,700,070 A * | 10/1972 | King | ..................... | B66F 11/042 182/16 |
| 3,858,688 A * | 1/1975 | Galloway | .............. | B66F 11/04 187/224 |

(Continued)

FOREIGN PATENT DOCUMENTS

GB        759187 A  * 10/1956  ............... E04G 1/22
GB       1355321 A  *  6/1974  ............... B66F 3/22

*Primary Examiner* — Colleen M Chavchavadze
(74) *Attorney, Agent, or Firm* — Law Office of Jeff Williams PLLC; J. Oliver Williams

(57) ABSTRACT

A modular observation assembly and method of use are presented herein. The assembly includes a portable base member that can roll along the ground. The base member defines an interior volume used for storage of various members and portions of the assembly. The assembly also includes an elevating platform in communication with the base member. The elevating platform operates between a lowered position and an elevated position. The assembly is stabilized by one or more jacks and a hitch attachment assembly configured to secure the base member to the neighboring vehicle.

18 Claims, 13 Drawing Sheets

(56) References Cited

U.S. PATENT DOCUMENTS

| | | | | |
|---|---|---|---|---|
| 3,871,478 A * | 3/1975 | Bushnell, Jr. | ........... | B66F 11/04 |
| | | | | 182/69.4 |
| 3,882,964 A * | 5/1975 | Schellenberg | .......... | B66F 11/04 |
| | | | | 182/69.4 |
| 3,889,778 A * | 6/1975 | Dotts | .................... | B66F 11/042 |
| | | | | 182/17 |
| 4,390,080 A * | 6/1983 | Bushnell, Jr. | ........... | B66F 11/04 |
| | | | | 182/115 |
| 4,619,346 A * | 10/1986 | Deguerry | ................ | B66F 11/04 |
| | | | | 182/141 |
| 4,967,733 A * | 11/1990 | Rousseau | ................ | B66F 11/04 |
| | | | | 182/13 |
| 6,523,641 B2 * | 2/2003 | Smith | ................... | A01M 31/02 |
| | | | | 182/127 |
| 8,251,177 B2 * | 8/2012 | Watt | .......................... | E04G 1/22 |
| | | | | 182/69.6 |
| 8,505,684 B1 * | 8/2013 | Bogue | .................. | B66F 11/042 |
| | | | | 182/19 |
| 8,926,253 B2 * | 1/2015 | Uttech | ................. | B60P 1/4414 |
| | | | | 414/462 |
| 9,630,666 B1 * | 4/2017 | Keene | ................. | B62D 63/061 |
| 2003/0000769 A1 * | 1/2003 | Pyle | ......................... | E06C 1/39 |
| | | | | 182/63.1 |
| 2008/0302602 A1 * | 12/2008 | Schultz | ................ | A01M 31/02 |
| | | | | 182/69.4 |
| 2010/0059466 A1 * | 3/2010 | Tanner | ................... | A47B 51/00 |
| | | | | 211/134 |
| 2012/0211302 A1 * | 8/2012 | Stewart | .................. | B66F 11/04 |
| | | | | 182/12 |
| 2019/0119090 A1 * | 4/2019 | Maisonnette | .......... | B66F 11/04 |

* cited by examiner

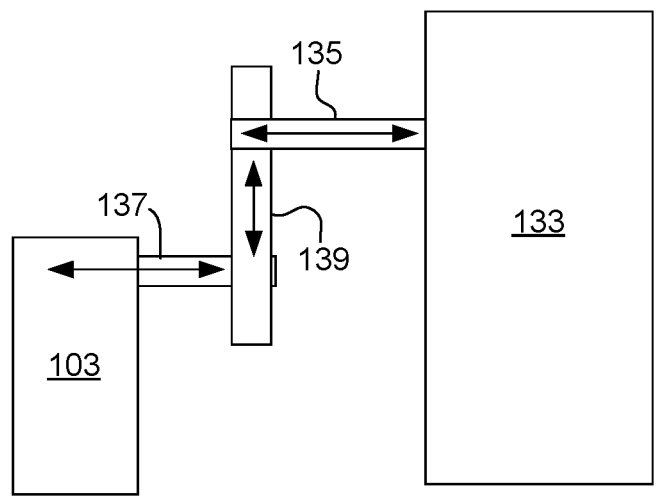
FIG. 9
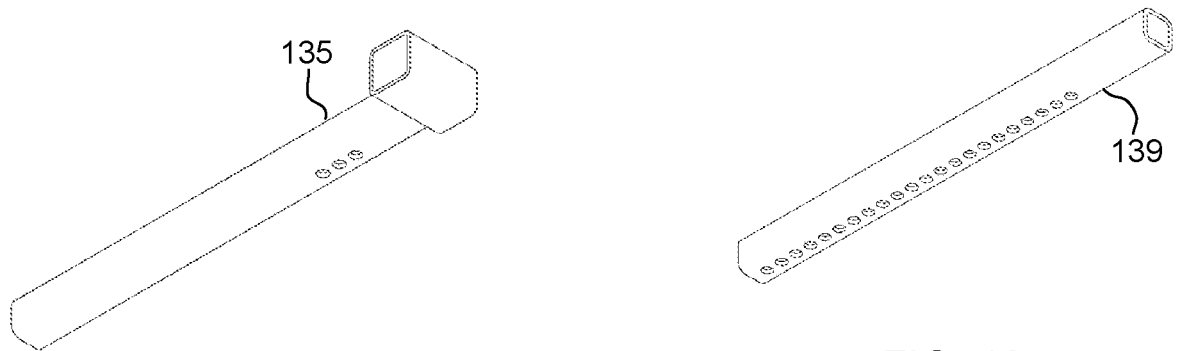
FIG. 10
FIG. 12
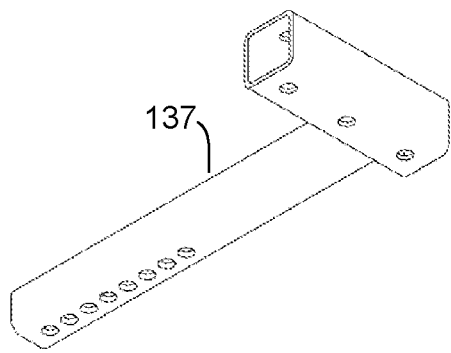
FIG. 11

MODULAR OBSERVATION ASSEMBLY AND METHOD

CLAIM OF PRIORITY

This application claims the benefit of U.S. Provisional Application No. 62/423,946, filed 18 Nov. 2016. The information contained therein is hereby incorporated by reference.

BACKGROUND

1. Field of the Invention

The present application relates to an observation platform, and more particularly to a modular assembly used to provide an elevated platform to enhance user's ability to view their environment.

2. Description of Related Art

Auto racing has become a very popular sport. Vehicles often race along a relatively circular route trying to complete as many laps as possible with the quickest time. Race fans are located either around the perimeter of the track in stands or within the track interior of the track in the infield. Although the race fans around the perimeter are in stadium styled seating to permit everyone a view of the track, the infield is relatively flat. The infield can be a difficult location to see the race as many obstructions to the view are present.

One manner often employed to overcome this is for race fans within the infield to climb atop a Recreational Vehicle so as to elevate themselves above the common obstructions. Although this has worked for the most part, it has also led to problems. It is not uncommon for race fans to fall from the top of the recreational vehicle and sustain serious injuries from falls.

In an effort to improve safety, race fans have thought to employ other concepts that are remotely similar. Some race fans have taken the time to bring into the infield a portable platform that they can construct on site. An example of which is scaffolding. These platforms are big and bulky and are very labor intensive to construct. Additional disadvantages include: an inability to collapse without disassembling the entirety of the platform, the platforms are also free-standing in that they are not secured in an erect manner so they can sway or tip relatively easily, and transportation of them into the infield often requires an additional trailer which takes up more space which is already in limited supply.

Although strides have been made to provide a better manner of viewing from the infield of a race track, shortcomings remain. It is desired that an assembly be provided that is securable in an erect position, is simpler to position and construct, and is transportable in a manner that minimizes space.

SUMMARY OF THE INVENTION

It is an object of the present application to provide a modular observation assembly for erection of an elevated platform above the ground. The platform is adjustable in height and is stabilized via one or both of a plurality of jacks and by attachment of the assembly to a neighboring vehicle. This assembly is ideally suited for use in the infield of race tracks where people need an elevated position to observe the race.

It is a further object of the present application that the assembly be collapsible for towing in or out of the infield, setup for race fans in a matter of minutes, have the ability to connect together to tow more than one system to service customers. Furthermore, the assembly is to be extremely mobile for placement anywhere under your own power.

The method of using the assembly is simplified in that a user merely has to locate the assembly at the desired location, initiate one or more safely stabilization methods (i.e. jacks and attachment to a neighboring vehicle), and then elevate the platform to the desired height. Use of this assembly avoids the need to use detailed and time consuming methods.

Ultimately the invention may take many embodiments but features the ability to create safety first and foremost, provide mobility for quick setup and takedown, have the ability to be setup in limited space, and provide versatility for all with a recreational vehicle to enjoy speedway events with the best view possible. In this way, this assembly overcomes the disadvantages inherent in the prior art.

The more important features of the assembly have thus been outlined in order that the more detailed description that follows may be better understood and to ensure that the present contribution to the art is appreciated. Additional features of the system will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the system in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 9 is a schematic of a hitch mount assembly used in the modular observation assembly of FIG. 1.

FIGS. 10-12 are perspective views of members in the hitch mount assembly of FIGS. 8 and 9.

Figure 1:
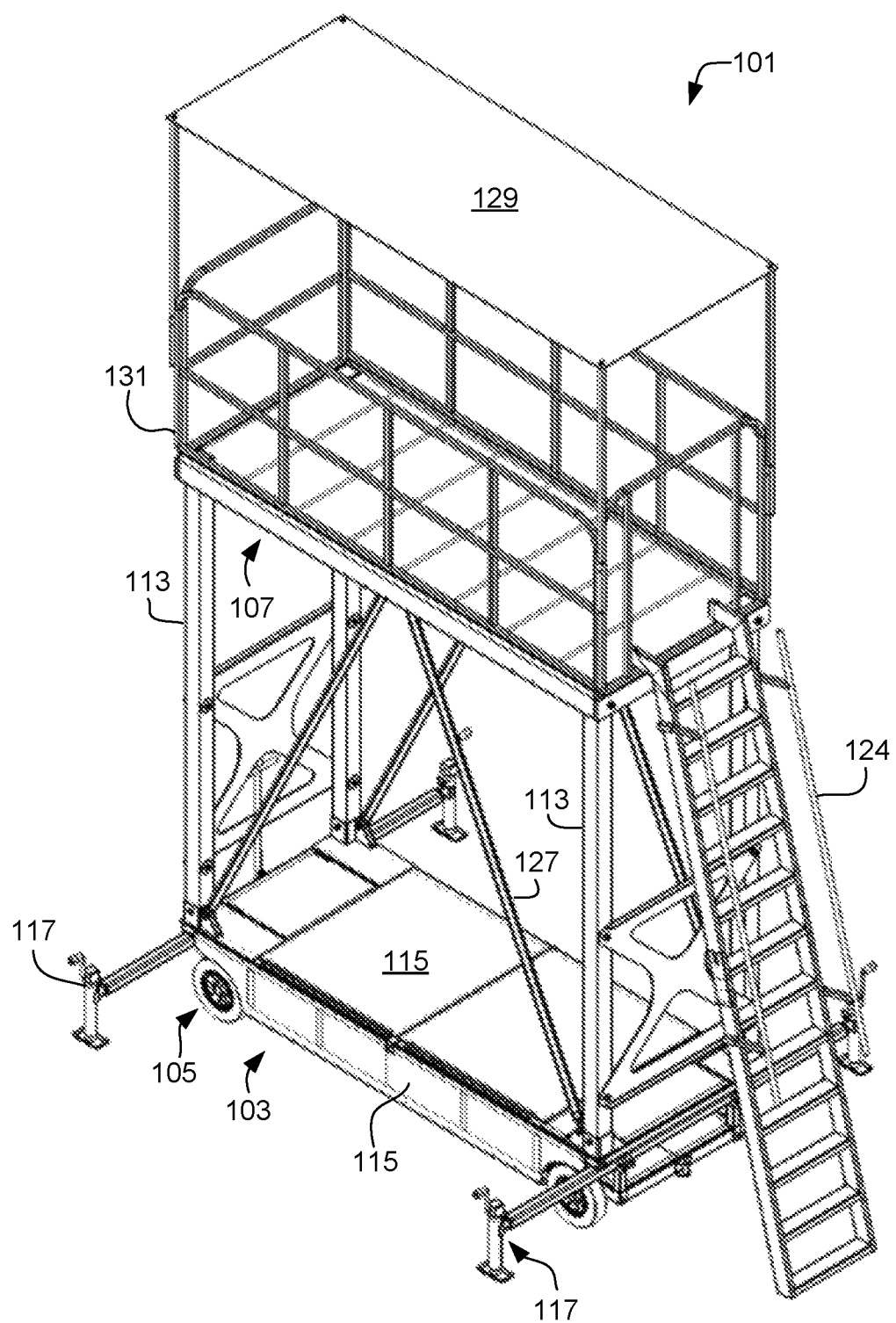
FIG. 1 is a perspective view of a modular observation assembly according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly and method in accordance with the present application overcomes one or more of the above-discussed problems commonly associated with elevated platforms discussed previously. In particular, the assembly creates a safe platform that can be elevated when in use and lowered during transportation. The assembly provides mobility for quick setup and takedown and is relatively compact so as to have the ability to be setup in limited spaces. The assembly is secured and stabilized in a two-manner approach by the use of extended supports or jacks and by coupling the base of the assembly to a neighboring vehicle at the hitch receiver. This helps to provide stability when the platform is elevated. These and other unique features of the assembly are discussed below and illustrated in the accompanying drawings.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The assembly includes a portable base member that can roll along the ground. The base member defines an interior volume used for storage of various members and portions of the assembly. It also includes an elevating platform in communication with the base member. The elevating platform operates between a lowered position and an elevated position. The assembly is stabilized by one or more jacks and a hitch attachment assembly configured to secure the base member to the neighboring vehicle. Additional features and functions of the device are illustrated and discussed below.

Referring now to the Figures wherein like reference characters identify corresponding or similar elements in form and function throughout the several views. The following Figures describe the assembly of the present application and its associated features. With reference now to the Figures, an embodiment of the modular observation assembly and method of use are herein described. It should be noted that the articles "a", "an", and "the", as used in this specification, include plural referents unless the content clearly dictates otherwise.

Referring now to FIG. 1 in the drawings, a perspective view of a modular observation assembly 101 is illustrated. Assembly 101 is configured to provide a portable platform for the elevation of users within their surroundings to provide a better vantage point. Ideally this is suited for use in the infield of race tracks where onlookers to the race need to be elevated so as to view the cars run around the track. Assembly 101 is configured to be deployable in an easy and fast manner. Additionally, it is configured to be safe by employing a two-manner stabilization method.

Assembly 101 includes a base member 103, a plurality of wheel assemblies 105, an elevating platform 107, and a hitch attachment assembly 109. Base member 103 is a rolling steel frame that defines an interior volume 111. Wheel assemblies 105 are coupled to base member 103 around the perimeter approximate the corners. Wheel assemblies 105 permit the entire assembly 101 to roll and maneuver along the ground. The wheel assemblies 105 may be configured to swivel, be locked into a particular orientation, or have one or more steering capabilities to permit an increased capability to turn.

Elevating platform 107 is made from aluminum and is configured to operate between an elevated position and a lowered position. In the elevated position as shown in FIG. 1, the platform 107 is located a distance above, or is separated from, base member 103. Platform 107 is may include a plurality of posts 113 inserted into the corners of base member 103 and act to guide the elevating platform when transitioning between the lowered position and the elevated position. In some embodiments, platform 107 may translate upward along the length of posts 113. It is also conceived that posts 113 may also include telescoping capabilities wherein platform 107 is rigidly coupled to a portion of posts 113 and posts 113 can lengthen and retract. Either way, posts 113 permit the locating of platform 107 at a particular distance above base member 103.

Figure 2:
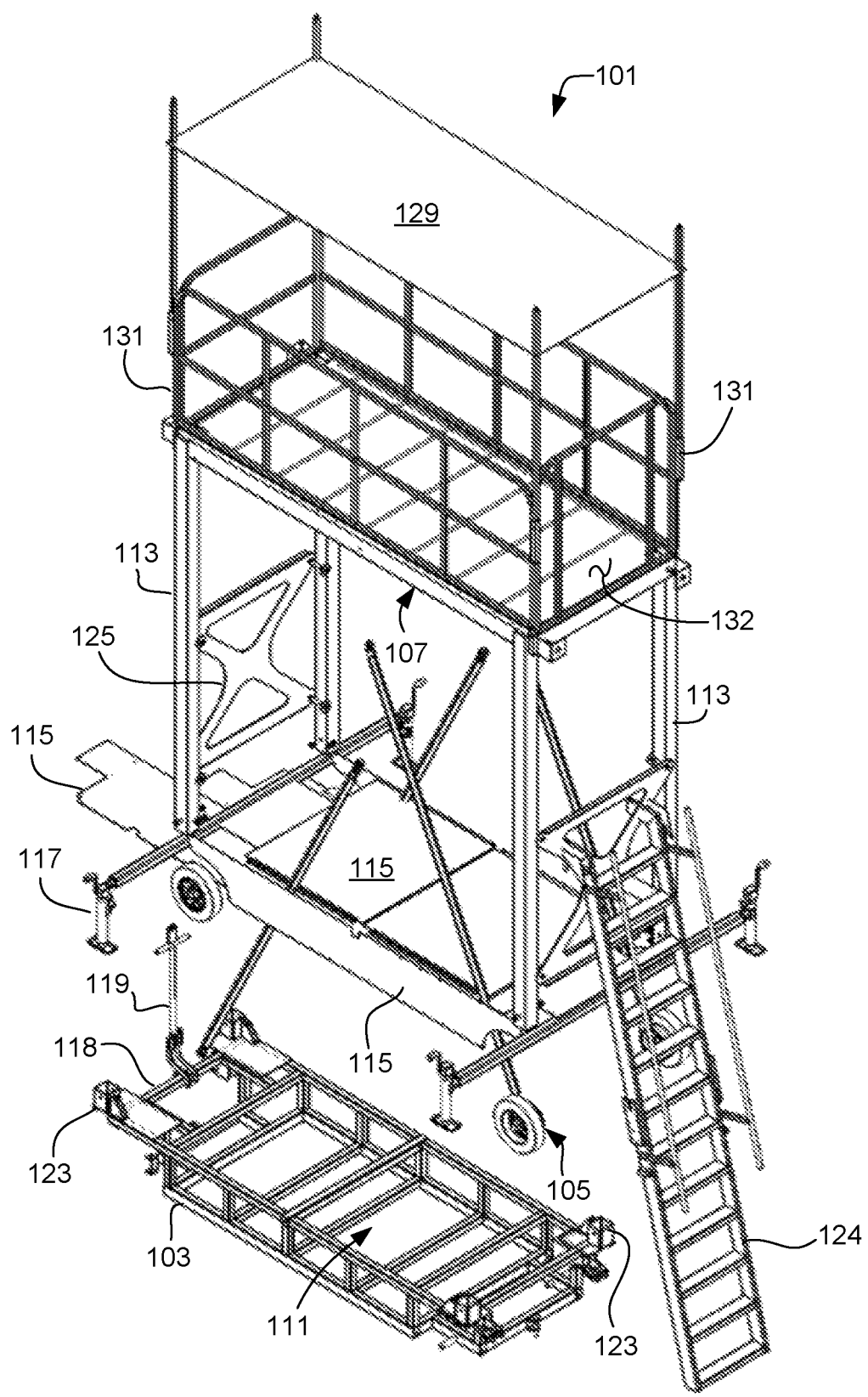
FIG. 2 is a partially exploded perspective view of the modular observation assembly of FIG. 1.

Referring now also to FIG. 2 in the drawings, a partially exploded perspective view of assembly 101 is illustrated. In FIG. 2, a number of various components are separated from one another to provide greater context and visual perspective. Base member 103 is better seen as a general frame. The particular material for base member 103 is not limited to aluminum but it should be such as to provide rigidity as well as weight advantages. Metallic materials are commonly used but other materials such as composites are also useful.

Also of particular note is that the interior volume 111 is visible in FIG. 2 as being the space within the perimeter of the frame of base member 103. Assembly 101 may further include paneling 115 that is configured to surround volume 111. Paneling 115 is coupled to member 103 and is useful in providing protection to volume 111. In so doing, volume 111 is useful as a storage compartment for the various components and members used with assembly 101.

As part of the two-manner stabilization method of assembly 101, jack stands 117 are coupled to the outer perimeter of base member 103. Stands 117 are configured to operate in a manner that allows them to adjust their relative position with respect to the sides of base member 103. As seen in FIGS. 1 and 2, stands 117 are in an extended position. Stands 117 are configured to extend outward away from member 103 as well as retract inward toward member 103 when not in use. This adjustable feature of stands 117 allows an operator the ability to adjust the distance in accordance with environmental conditions and the expected loads placed on platform 107. Stands 117 can include a horizontal pole which translates within a sleeve 118 on base member 103 to permit its length adjustment. Other ways and manners are considered possible and within the scope of the present application. Once situated at the desired distance, a footing is lowered into contact with the ground. As noted previously, stands 117 are ideally withdrawn from the ground and retracted toward member 103 prior to transportation of assembly 101.

Figure 3:
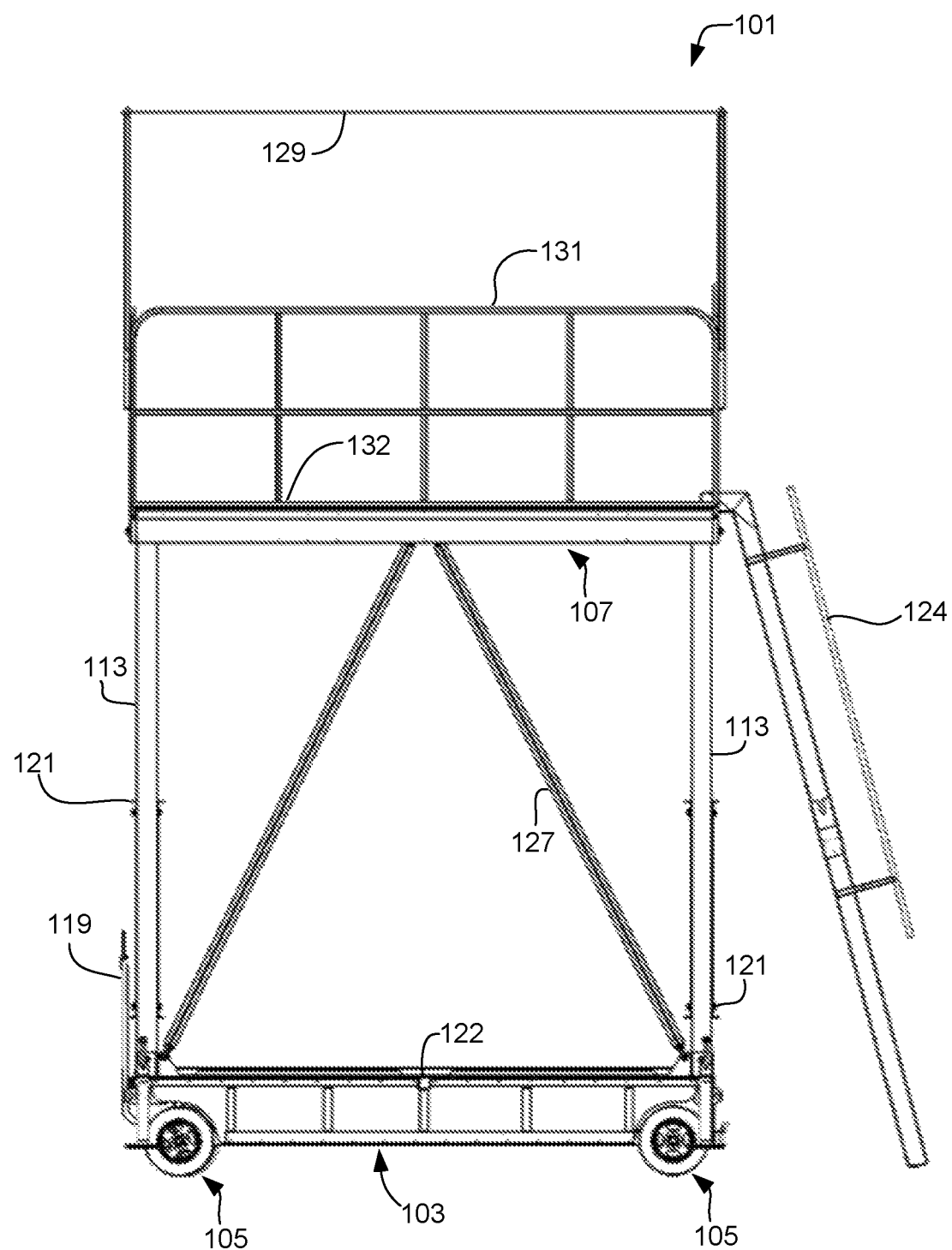
FIG. 3 is a front view of the modular observation assembly of FIG. 1.
Figure 4:
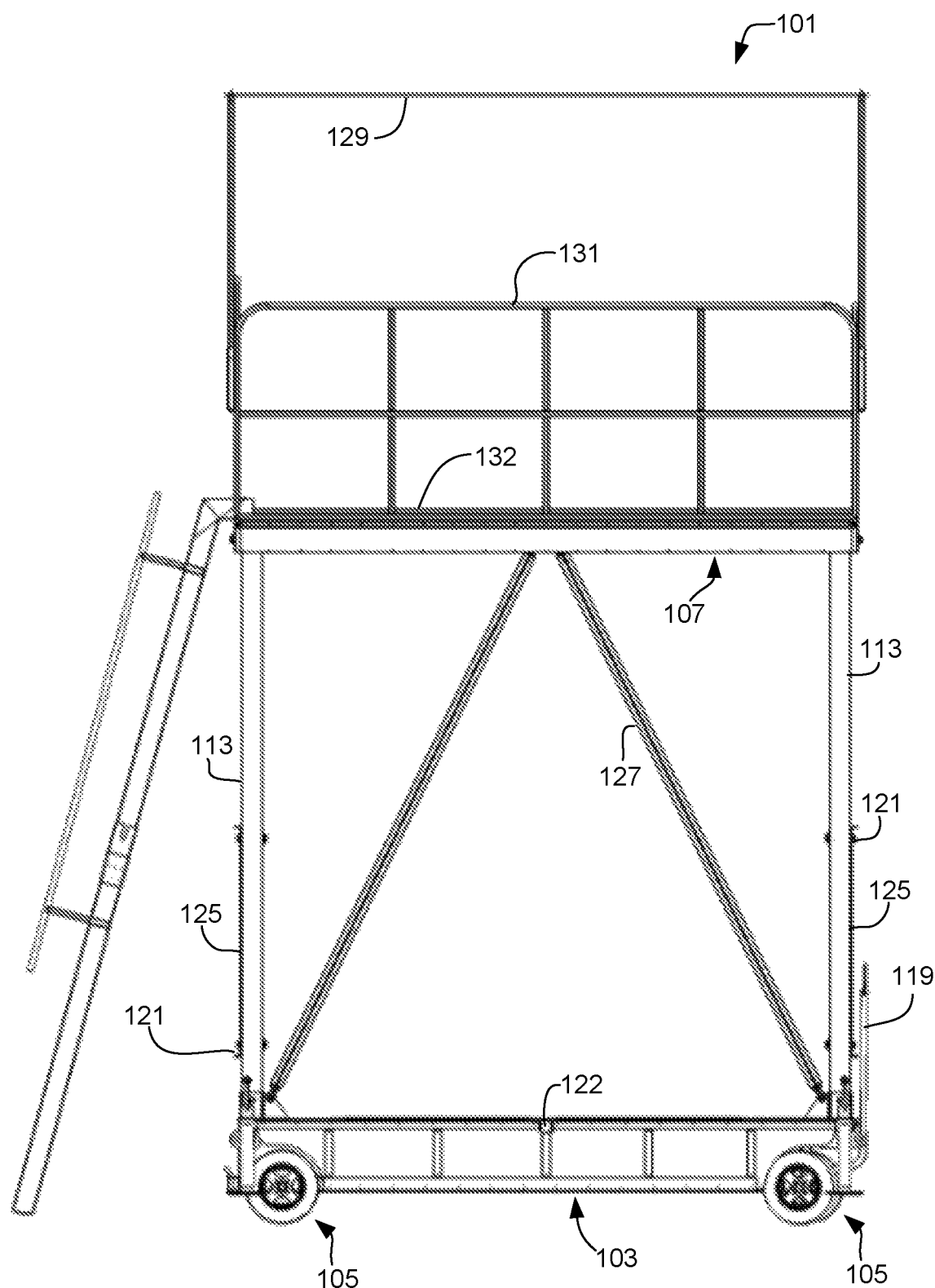
FIG. 4 is a rear view of the modular observation assembly of FIG. 1.

Referring now also to FIGS. 3 and 4 in the drawings, front and back views of assembly 101 are provided. FIGS. 3 and 4 are views of FIG. 1. As noted previously, assembly 101 is configured to be portable allowing it to move locations as a singular unit. Assembly 101 may also further include a steering handle 119 coupled to base member 103. Handle 119 is configured to permit a user to steer and guide assembly 101 (i.e. base member 103) during transportation. Additionally, handle 119 provides the user the ability to fine tune the precise location of assembly 101 in relation to a neighboring vehicle. Handle 119 may be in communication with wheel assemblies 105 at one or both ends of base member 103 so as to provide steering capability.

Of further note is the use of adjustment pins 121 with posts 113. Pins 121 are used to help set either the length of the post 113 and/or secure platform 107 to one end of the post 113. As seen back in FIG. 2 of the drawings, posts 113 are configured to be inserted into brackets 123 at the corners of base member 103. In situations where posts 113 are adjustable in length, pins 121 are used to set the particular length. Pins 121 are also configured to secure platform 107 to posts 113. Pins 121 pass through a portion of post 113 and either base member 103 and platform 107. When not in use, posts 113 are configured to be stowed in volume 111.

As seen in the various figures, assembly 101 may further include a ladder assembly 124. Ladder assembly 124 is also stowable within volume 111 when not in use. When in use, ladder assembly 124 is configured to releasably couple to a portion of elevated platform 107 and extend downward at an angle, having a length sufficient enough to reach the ground. Users are able to climb ladder assembly 124 to enter and exit platform 107. The length of ladder assembly 124 is adjustable to accommodate various elevations of platform 107.

Of further note in FIGS. 3 and 4 is the location of a hitch mount 122. Hitch mount 122 is used as part of the two-manner stabilization method described previously with stands 117. Mounts 122 are located relatively centrally along base member 103 in both a front side and a rear side. It is understood that mounts 122 may be limited to a particular side only as well. Additionally, they may be located on an end as well, however this may be less than ideal as ladder assembly 124 and steering handle 119 would interfere with the purpose of mounts 122. Mounts 122 are operable with hitch mount assembly 109 which permits assembly 101 to be coupled to a neighboring vehicle. Hitch mount assembly 109 may be used on either side of member 103.

Figure 5:
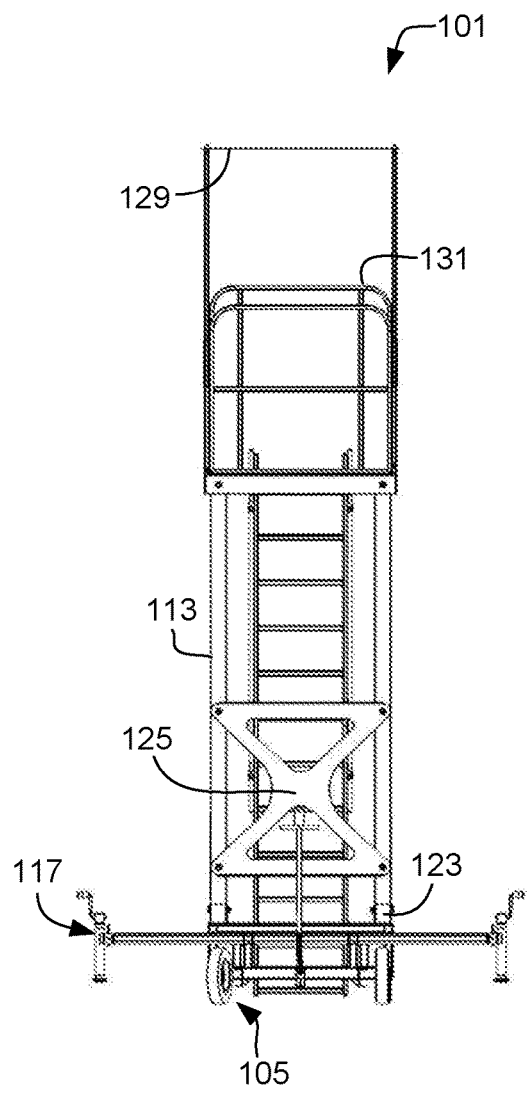
FIGS. 5 and 6 are end views of the modular observation assembly of FIG. 1.
Figure 6:
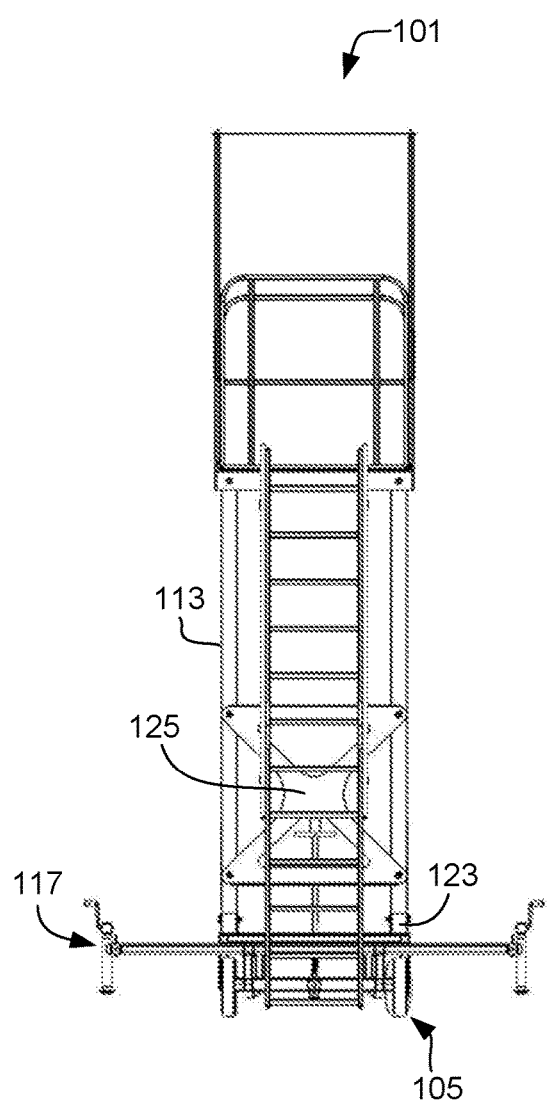

Referring now also to FIGS. 5 and 6 in the drawings, a right and left side view of assembly 101 is provided. FIG. 5 provides the left side view while FIG. 6 provides the right side view. Assembly 101 may further include one or more braces to help stabilize platform 107 above base member 103. In an elevated position, posts 103 are not necessarily suited to provide sufficient rigidity, partly due to the resultant shape of the structure being that of a rectangle. Therefore, assembly 101 may include braces 125 and braces 127. Braces 125 are located at the ends/sides of assembly 101. These extend between posts 113 at each end to provide rigidity to the structure. Similarly, braces 127 are internally located between platform 107 and base member 103/posts 113 wherein they cross between the sides both in front and in the rear of assembly 101. Both sets of braces 125 and 127 increase the rigidity of assembly 101 when platform 107 is elevated. Both braces 125 and 127 may be located in place with pins 121. In these cases, pins 121 may be sized to be smaller than when described previously. When not used, braces 125 and 127 may be stowed within volume 111.

Figure 7:
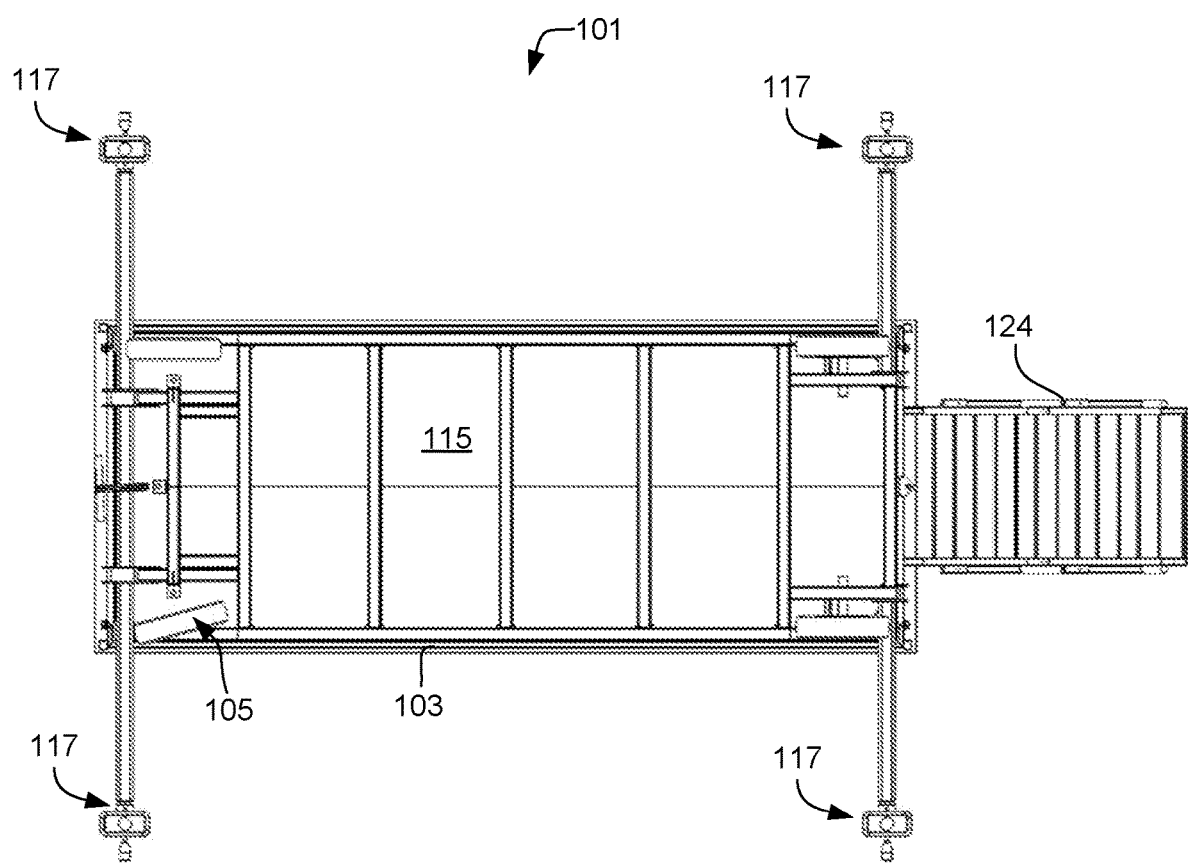
FIG. 7 is a bottom view of the modular observation assembly of FIG. 1.

Referring now also to FIG. 7 in the drawings, a bottom view of assembly 101 is illustrated. In this view, one of the wheel assemblies 105 is illustrated in a turned position.

Figure 8:
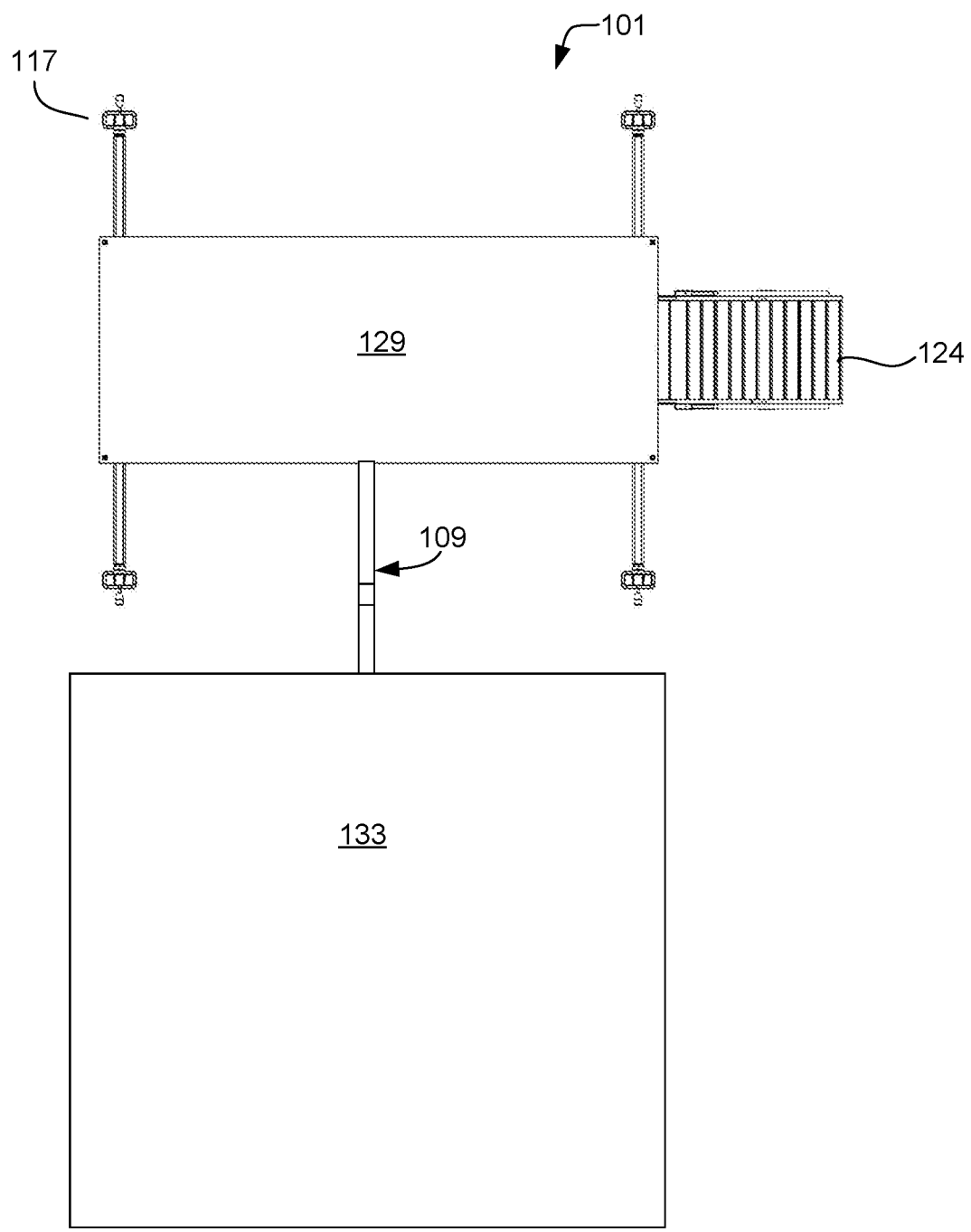
FIG. 8 is a top view of the modular observation assembly of FIG. 1.

Referring now also to FIG. 8 in the drawings, a top view of assembly 101 is provided. A cover 129 is clearly visible stretching across platform 107. Cover 129 provides shade to the users on platform 107. Cover 129 may be removable, adjustable in height, retractable to permit size adjustment (i.e. similar to an awning or cloth boat cover), or rigid. When not in use cover 129 is stowable in volume 111. Also, assembly 101 may include a safety rail 131 releasably coupled to platform 107 and extending above an upper surface 132 thereof. Rail 131 provides security and safety to users on platform 107. Rail 131 may be stowed in volume 111.

Hitch mount assembly 109 is shown extending between assembly 101 and vehicle 133. Vehicle 133 has a hitch for acceptance of a receiver. Assembly 109 is configured to provide a second means of stabilizing assembly 101 to prevent tipping and swaying when in use. As seen, assembly 109 extends from a front side of base member 103 between mount 122 and the hitch of vehicle 133.

Referring now also to FIGS. 9-12 in the drawings, various views of hitch mount assembly 109 are provided. Assembly 109 is configured to be adjustable to accommodate the ride height of vehicle 133 compared to that of the location of mount 122. To do this, assembly 109 includes a plurality of members that work together to permit adjustment in both the overall length of assembly 109 between assembly 101 and vehicle 133, as well as adjustment in height between mount 122 and the hitch of vehicle 133. As seen in particular in FIG. 9, a series of at least 3 members is used to provide this adjustability. A first member 135 extends from the hitch of vehicle 133 a selected distance. This overall distance is fairly constant. A second member 137 extends away from mount 122 toward vehicle 133. The extended distance may be adjustable to permit variation in placement of assembly 101 compared to the vehicle 133. A third member 139 extends between the first and second members to provide vertical height adjustment there between. In FIGS. 10-12 exemplary embodiments of the members of hitch mount assembly 109 are provided. FIG. 10 provides a representation of the first member. FIG. 11 provides a representation of the second member. FIG. 12 provides a representation of the third member. In use, steering handle 119 may be used to fine tune the location of assembly 101 so as to better align mount 122 with the hitch of vehicle 133. It is understood that any of members 135/137/139 may include one or more sleeves and apertures for providing means of selective placement or locating of each member relative to another. FIGS. 10-12 are merely examples of potential representations of acceptable forms for each member.

Figure 13:
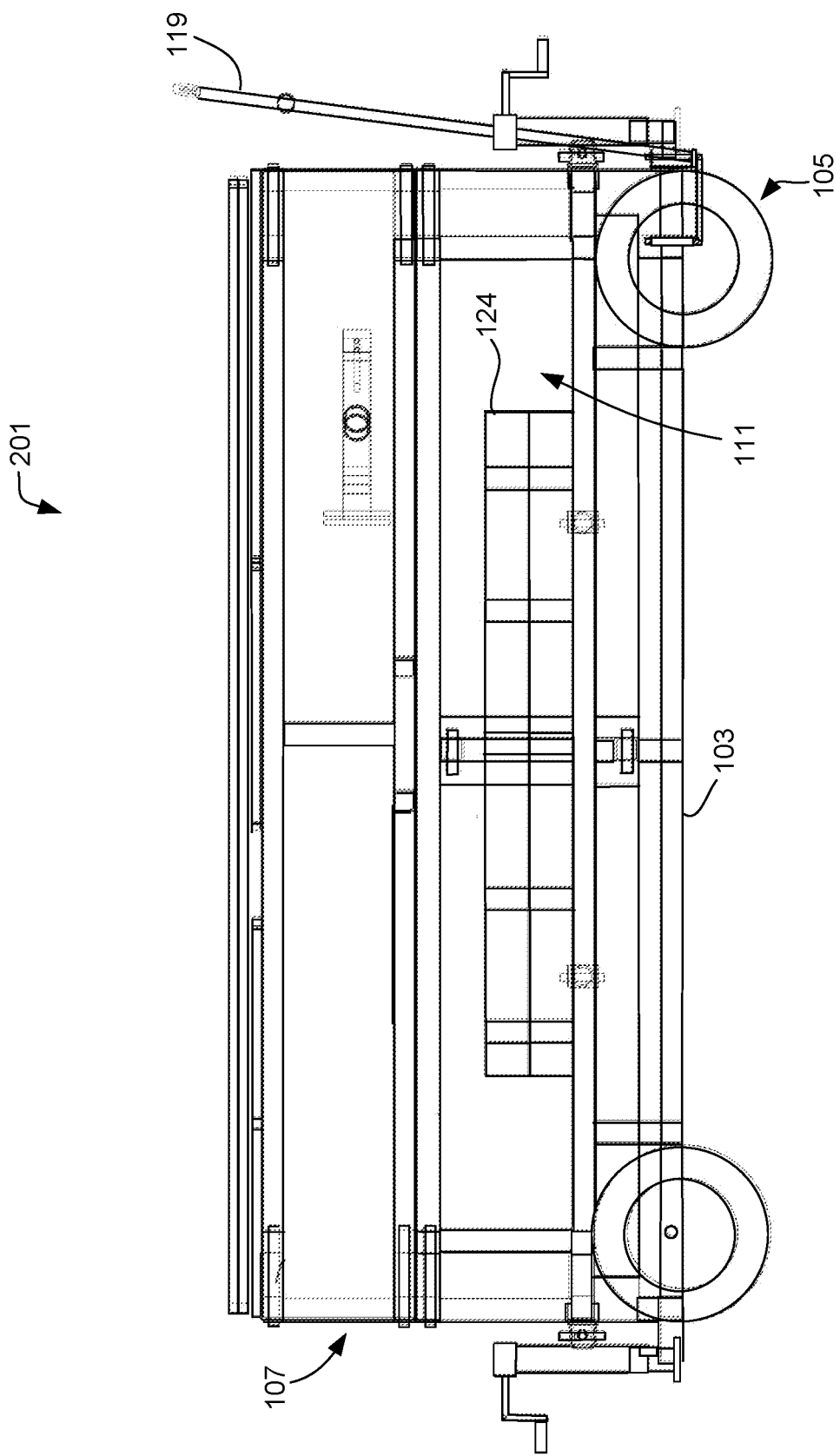
FIG. 13 is a side view of an alternate embodiment of the modular observation assembly of FIG. 1.

Referring now also to FIG. 13 in the drawings, a collapsed view of assembly 101 is provided wherein platform 107 is in the lowered position and assembly 101 is ready for transportation.

Figure 14:
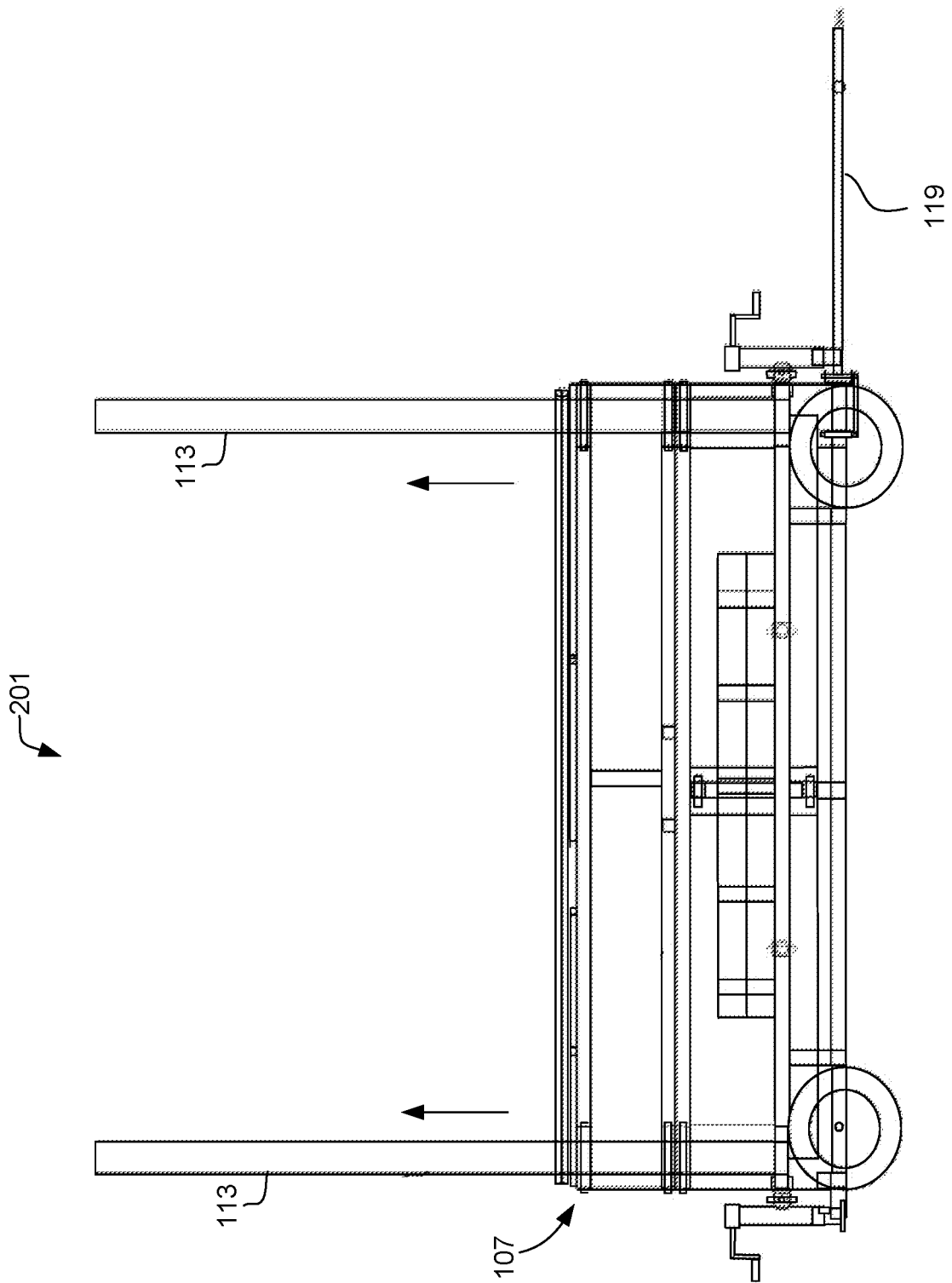
FIGS. 14-16 are side views of the modular observation assembly of FIG. 13 showing the manner of erecting an elevating platform.
Figure 15:
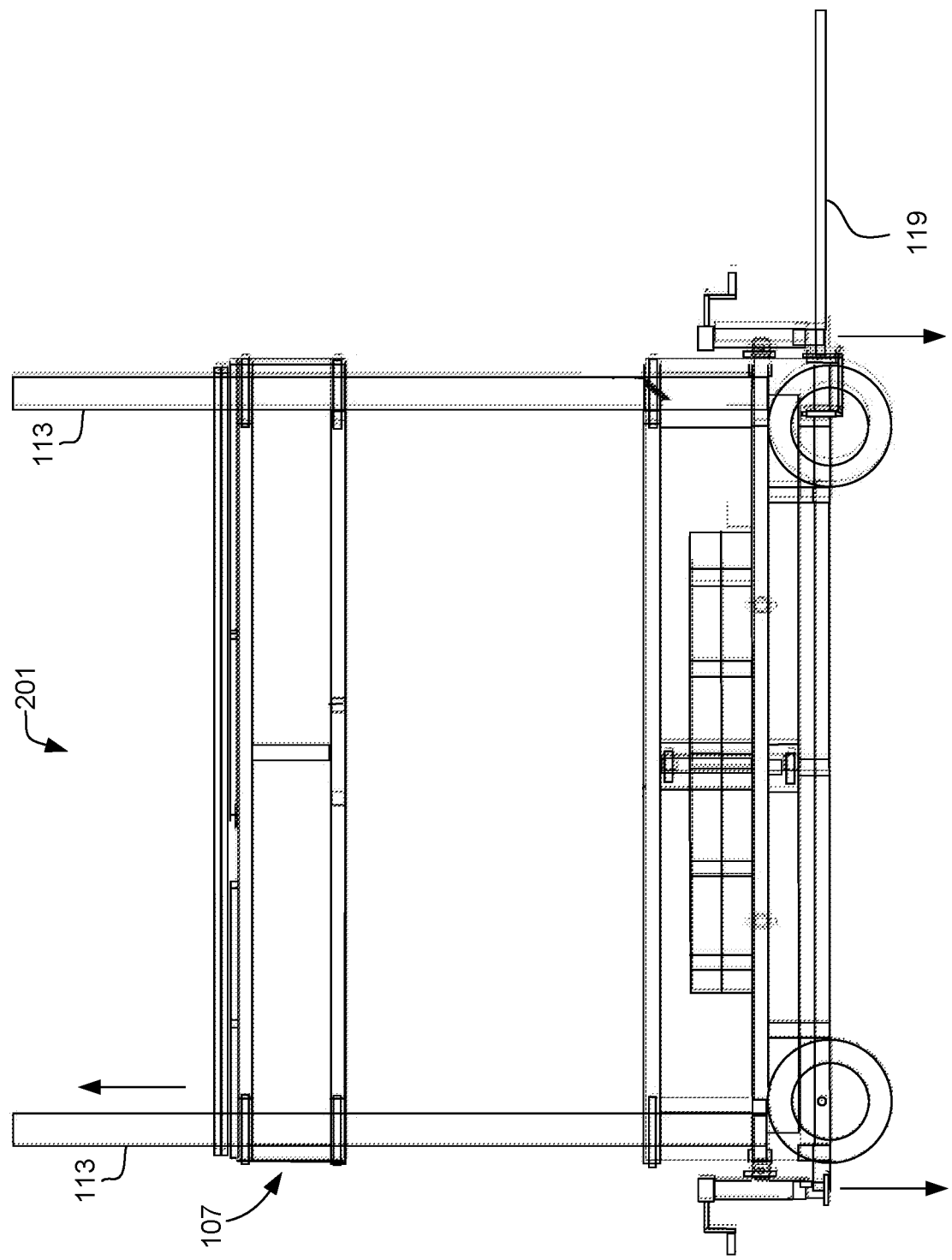
Figure 16:
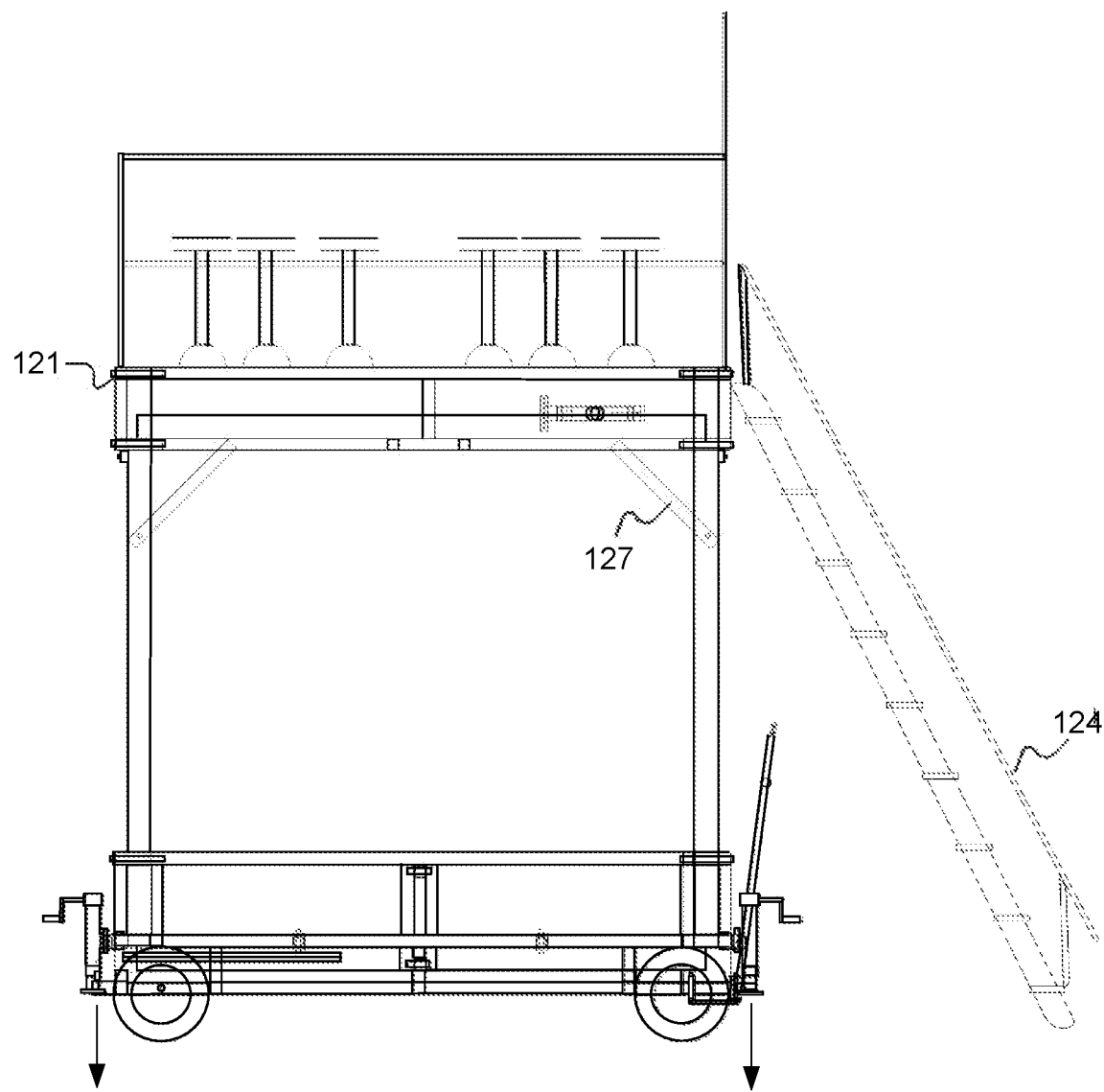

Referring now also to FIGS. 14-16 in the drawings, side views of an exemplary representation of an alternate embodiment 201 of assembly 101 are provided to illustrate the manner of operation of assembly 101. Assembly 201 is similar in form and function to that of assembly 101. Slight variations are shown herein with respect to assembly 201 to further support and describe the function and operation of assembly 101. Base member 103 is moved into position behind the designated vehicle 133. It may be pulled behind a slow moving vehicle such as a golf cart, ATV, or even a tractor. Final positioning may be provided through using the steering handle 119 to guide its path. Adjustable crank jacks 117 on all four corners are used to elevate the assembly to an appropriate height. This helps in connecting the assembly to the recreation vehicle via the hitch mount assembly 109 for increased stability. Aluminum post 113 are removed from the volume 111 and pass through the top floors four corners of the platform 107 so that platform 107 may travel freely up and down to the elevated position using a lift dolly, hoist, or winch for example. The posts rest in brackets at the base member. Platform 107 will then lock in place using the height adjustment pins 121 at a particular elevation. Safety Rails 131 are then folded up and locked into place. Safety Ladder 124 is removed from volume 111 and fastened to an upper surface 133 of platform 107. Braces 125/127 are secured on for additional support. Cushioned seating is placed into position on platform 107 for the users.

It is worth noting that braces 127 are illustrated as being shorter in this embodiment. Braces 127 may be of any suitable length to provided needed rigidity to the overall structure. Additionally, pins 121 are shown in communication with the upper portion of posts 113 and platform 107.

An ideal use of assembly 101/201 are for instances where a potential renter would rent the assembly at the speedway. Trained employees would then deliver and setup the assembly to accompany their vehicle using all the proper installation techniques. The renters could have no responsibilities when it comes to setting up the assembly and is completely hassle free for them. The process will be extremely quick and precise unlike anything out there for setup and take down. The assembly will give the individuals a quick, safe, and hassle-free way to watch a race from the infield without having to worry about constructing big bulky scaffolding, or falling off their vehicle. Once constructed the renters will be able to access the platform area by simply walking up the ladder to the upper viewing area surrounded by safety rails.

It is understood that each assembly 101/201 could be used at any event where a safe elevated viewing area is necessary or allowed, and space is limited or plentiful. The assembly of the present application will work with any vehicle having a standard hitch. A great example of events would be tailgating, sporting events, or concert events.

Figure 17:
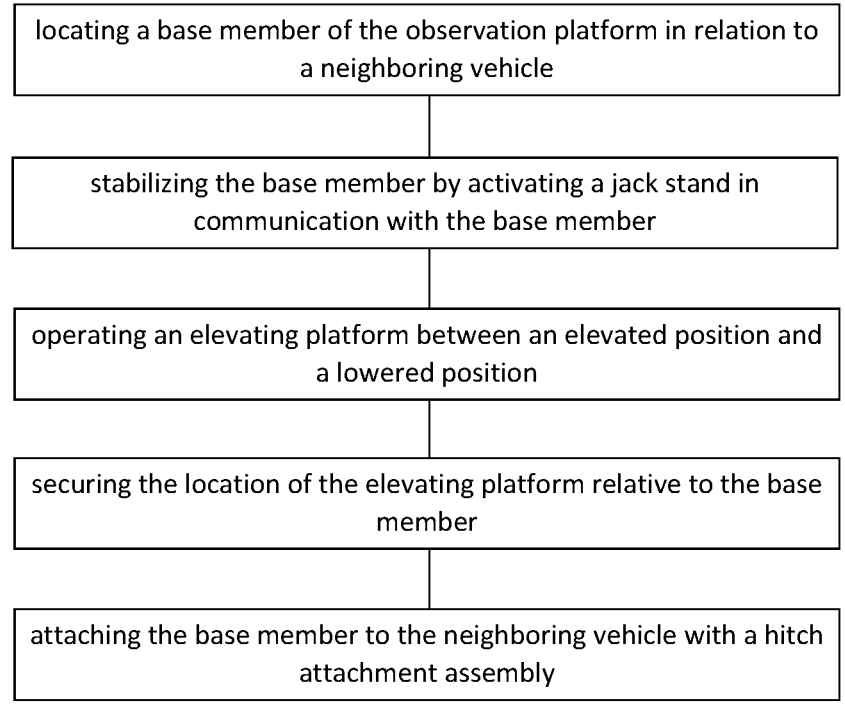
FIG. 17 is a chart of the method of using the modular observation assembly of FIGS. 1 and 13.

FIG. 17 is a chart of the method of use of assembly 101/201.

The current application has many advantages over the prior art including at least the following: (1) two-manner stabilization of an elevated platform; (2) modular capability; (3) safe, fast, and easy to operate; and (4) easily portable.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A modular observation assembly, comprising:
   a base member having a pair of opposing sides and a pair of opposing ends for defining an interior volume, the pair of opposing sides being non-parallel to and between the pair of opposing ends;
   a plurality of wheel assemblies coupled to the base member;
   an elevating platform in communication with the base member, the elevating platform operating between a lowered position and an elevated position;
   a steering handle extending from at least one of the opposing ends of the base member being configured to steer and guide the base member;
   a hitch mount directly attached to at least one of the pair of opposing sides of the base member, the hitch mount being perpendicular to the pair of opposing sides and the steering handle; and a hitch attachment assembly removably attached to the hitch mount, the hitch attachment assembly configured to secure the base member to a neighboring vehicle.

2. The assembly of claim 1, wherein the hitch attachment assembly is detachable from the neighboring vehicle.

3. The assembly of claim 1, wherein the hitch attachment assembly is adjustable in both a vertical and a horizontal direction to accommodate both height differences and distance between the base member and the neighboring vehicle.

4. The assembly of claim 1, further comprising:
a jack stand in communication with the base member, the jack stand configured to stabilize the base member in a selected location.

5. The assembly of claim 1, wherein the elevating platform includes a plurality of posts inserted into corners of the base member and act to guide the elevating platform when transitioning between the lowered position and the elevated position.

6. The assembly of claim 5, wherein the elevated position of the elevating platform is adjustable in distance from the base member.

7. The assembly of claim 5, wherein the elevating platform includes one or more adjustment pins configured to secure the elevating platform at a particular height on each of the plurality of posts.

8. The assembly of claim 5, further comprising:
a plurality of braces extending between the elevating platform and the plurality of posts.

9. The assembly of claim 1, further comprising:
a ladder assembly to permit access onto an upper surface of the elevating platform.

10. The assembly of claim 9, wherein the interior volume of the base member provides room for storage of the ladder assembly.

11. The assembly of claim 9, further comprising:
a safety rail releasably coupled to the elevating platform and extending above the upper surface.

12. A method of erecting the observation assembly of claim 1, comprising:
Positioning the observation assembly in relation to a neighboring vehicle;
stabilizing the base member by activating a jack stand in communication with the base member and configured to selectively contact the ground;
operating the elevating platform between an elevated position and a lowered position, the elevating platform in communication with the base member;
securing the location of the elevating platform relative to the base member; and
attaching the base member to the neighboring vehicle with the hitch attachment assembly.

13. The method of claim 12, further comprising:
placing a ladder assembly in communication with the elevating platform so as to permit access to an upper surface of the elevating platform.

14. The method of claim 12, further comprising:
erecting a side rail along an upper surface of the elevating platform.

15. The method of claim 12, wherein the hitch attachment assembly is adjustable in both a vertical and a horizontal direction to accommodate both height differences and distance between the base member and the neighboring vehicle.

16. The method of claim 12, wherein the elevating platform includes a plurality of posts inserted into corners of the base member and act to guide the elevating platform when transitioning between the lowered position and the elevated position.

17. The method of claim 12, further comprising:
bracing the elevating platform in an elevated position with a brace.

18. A modular observation assembly, comprising:
a base member having a pair of opposing sides and a pair of opposing ends for defining an interior volume, the pair of opposing sides being perpendicular to and extending between the pair of opposing ends;
a plurality of wheel assemblies coupled to the base member;
an elevating platform in communication with the base member, the elevating platform operating between a lowered position and an elevated position;
a hitch mount directly attached to at least one of the pair of opposing sides of the base member, the hitch mount being perpendicular to at least one of the pair of opposing ends and parallel to a wheel axis of the plurality of wheel assemblies; and
a hitch attachment assembly removably attached to the hitch mount, the hitch attachment assembly configured to secure the base member to a neighboring vehicle.

* * * * *